United States Patent
Suresh et al.

(10) Patent No.: US 10,212,679 B1
(45) Date of Patent: Feb. 19, 2019

(54) METHOD AND APPARATUS FOR DELAY SPREAD ESTIMATION

(71) Applicant: MBIT WIRELESS, INC., Irvine, CA (US)

(72) Inventors: Keerthivasan Suresh, Chennai (IN); Anandhavadivel Sepperumal, Puducherry (IN); Karthik Thirukannan, Puducherry (IN); Krishnavelan Sivaraman, Puducherry (IN)

(73) Assignee: MBIT WIRELESS, INC., Irvine, CA (US)

( * ) Notice: Subject to any disclaimer, the term of this patent is extended or adjusted under 35 U.S.C. 154(b) by 236 days.

(21) Appl. No.: 15/217,048

(22) Filed: Jul. 22, 2016

(51) Int. Cl.
H04W 56/00 (2009.01)
H04L 5/00 (2006.01)
H04L 27/26 (2006.01)

(52) U.S. Cl.
CPC ......... *H04W 56/0015* (2013.01); *H04L 5/006* (2013.01); *H04L 5/0007* (2013.01); *H04L 27/2628* (2013.01)

(58) Field of Classification Search
CPC ........... H04W 56/004; H04W 56/0055; H04W 52/24; H04W 52/241
See application file for complete search history.

(56) References Cited

U.S. PATENT DOCUMENTS

| | | | |
|---|---|---|---|
| 2008/0113636 A1* | 5/2008 | Kikuchi | H04W 56/0045 455/130 |
| 2008/0137525 A1* | 6/2008 | Liu | H04L 25/0232 370/203 |
| 2008/0268885 A1* | 10/2008 | Onggosanusi | H04J 11/0069 455/466 |
| 2010/0238980 A1* | 9/2010 | Cairns | H04B 1/7115 375/148 |
| 2012/0027048 A1* | 2/2012 | Lindoff | H04L 25/03006 375/140 |
| 2013/0010903 A1* | 1/2013 | Kent | H04L 5/0023 375/340 |
| 2013/0315191 A1* | 11/2013 | Yoshimoto | H04J 11/0056 370/329 |

* cited by examiner

*Primary Examiner* — Andrew W Chriss
*Assistant Examiner* — Kenan Cehic
(74) *Attorney, Agent, or Firm* — Lerner, David, Littenberg, Krumholz & Mentlik, LLP

(57) ABSTRACT

The propagation channel in a wireless communication system may be characterized as a multipath fading model wherein the multiple delayed and attenuated versions of the transmitted signal are received. In the receiver's processing chain, the impairments introduced by this propagation channel may be equalized using the channel estimates. The channel estimation is mainly performed using the known reference signals by conventional methods. The estimation of delay spread profile may be crucial for high performance channel estimation. The conventional methods may be appropriate for high operating channel bandwidths. In the case of low channel bandwidth, limited number of reference signals may be available which may not be adequate for accurate delay spread estimation. A method and apparatus are disclosed that improve the delay spread estimation for low channel bandwidth scenarios.

22 Claims, 22 Drawing Sheets

FIG. 2
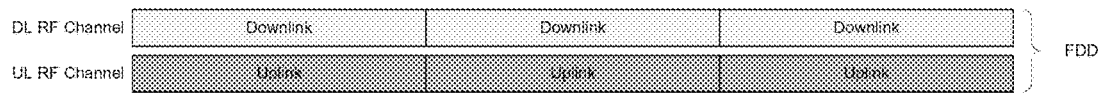
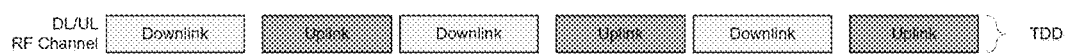

FIG. 17    1700

METHOD AND APPARATUS FOR DELAY SPREAD ESTIMATION

BACKGROUND

Typically, as shown in FIG. 1, a wireless communication system 10 comprises elements such as client terminal or mobile station 12 and base stations 14. Other network devices which may be employed, such as a mobile switching center, are not shown. In some wireless communication systems there may be only one base station and many client terminals while in some other communication systems such as cellular wireless communication systems there are multiple base stations and a large number of client terminals communicating with each base station.

As illustrated, the communication path from the base station (BS) to the client terminal direction is referred to herein as the downlink (DL) and the communication path from the client terminal to the base station direction is referred to herein as the uplink (UL). In some wireless communication systems the client terminal or mobile station (MS) communicates with the BS in both DL and UL directions. For instance, this is the case in cellular telephone systems. In other wireless communication systems the client terminal communicates with the base stations in only one direction, usually the DL. This may occur in applications such as paging.

The base station with which the client terminal is communicating is referred to as the serving base station. In some wireless communication systems the serving base station is normally referred to as the serving cell. While in practice a cell may include one or more base stations, a distinction is not made between a base station and a cell, and such terms may be used interchangeably herein. The base stations that are in the vicinity of the serving base station are called neighbor cell base stations. Similarly, in some wireless communication systems a neighbor base station is normally referred as a neighbor cell.

Duplexing refers to the ability to provide bidirectional communication in a system, i.e., from base station to client terminals (DL) and from client terminals to base station (UL). There are different methods for providing bidirectional communication. One of the commonly used duplexing methods is Frequency Division Duplexing (FDD). In FDD wireless communication systems, two different frequencies, one for DL and another for UL are used for communication. In FDD wireless communication system, the client terminals may be receiving and transmitting simultaneously.

Another commonly used method is Time Division Duplexing (TDD). In TDD based wireless communication systems, the same exact frequency is used for communication in both DL and UL. In TDD wireless communication systems, the client terminals may be either receiving or transmitting but not both simultaneously. The use of the Radio Frequency (RF) channel for DL and UL may alternate on periodic basis. For example, in every 5 ms time duration, during the first half, the RF channel may be used for DL and during the second half, the RF channel may be used for UL. In some communication systems the time duration for which the RF channel is used for DL and UL may be adjustable and may be changed dynamically.

Yet another commonly used duplexing method is Half-duplex FDD (H-FDD). In this method, different frequencies are used for DL and UL but the client terminals may not perform receive and transmit operations at the same time. Similar to TDD wireless communication systems, a client terminal using H-FDD method must periodically switch between DL and UL operation. All three duplexing methods are illustrated in FIG. 2.

In many wireless communication systems, normally the communication between the base station and client terminals is organized into frames as shown in FIG. 3. The frame duration may be different for different communication systems and normally it may be on the order of milliseconds. For a given communication system the frame duration may be fixed. For example, the frame duration may be 10 milliseconds.

In a TDD wireless communication system, a frame may be divided into a DL subframe and a UL subframe. In TDD wireless communication systems, the communication from base station to the client terminal (DL) direction takes place during the DL subframe and the communication from client terminal to network (UL) direction takes place during UL subframe on the same RF channel.

Orthogonal Frequency Division Multiplexing (OFDM) systems such as 3rd Generation Partnership Project (3GPP) Long Term Evolution (LTE) wireless communication system typically use Cyclic Prefix (CP) to combat inter-symbol interference and to maintain the subcarriers orthogonal to each other under a multipath fading propagation environment. The CP is a portion of the sample data that is copied from the tail part of an OFDM symbol to the beginning of the OFDM symbol as shown in FIG. 4. One or more OFDM symbols in sequence as shown in FIG. 4 are referred herein as OFDM signal.

Most wireless communication systems may employ some form of framing in the air interface. For example, 10 ms radio frames are used in the 3GPP LTE wireless communication system and each radio frame comprises 10 subframes as shown in FIG. 5. Each subframe in turn consists of two slots and each slot consists of 6 or 7 OFDM symbols depending on the type of CP used as shown in FIG. 5. In the 3GPP LTE wireless communication system, two different CP lengths are used and they are referred to as Normal CP and Extended CP. In wireless communication systems, normally the specific air interface frame structure repeats itself over certain periodicity.

The 3GPP LTE wireless communication system uses the following synchronization signals to assist the client terminal in achieving time and frequency synchronization as well as the detection of Physical layer Cell Identity (PCI):

Primary Synchronization Signal (PSS)
Secondary Synchronization Signal (SSS)

The positions of the PSS and SSS within a frame are illustrated in FIG. 6 for FDD air-interface of 3GPP LTE wireless communication system. Note that the figure shows the position of the PSS and SSS for both the Normal CP and Extended CP. FIG. 7 illustrates the PSS and SSS positions for TDD air-interface of 3GPP LTE wireless communication system.

The different PSS and SSS are identified by different signal sequences used for transmission. Specifically, 504 PCI's are defined in 3GPP LTE wireless communication system specifications and they are organized into 168 groups with three identities in each group. The SSS sequence identifies the PCI group and PSS identifies the cell within a group.

The PSS sequences in frequency domain are length 63 Zadoff-Chu sequences extended with five zeros on each side and mapped to central 72 subcarriers as shown in FIG. 8. The Direct Current (DC) subcarrier is not used. In 3GPP LTE wireless communication system three different PSS sequences are used with Zadoff-Chu root indices 24, 29 and 34 corresponding to cell identity 0, 1 and 2 respectively within a PCI group. The exact PSS sequences are defined in the 3GPP LTE wireless communication system specification TS 36.211 "Physical Channels and Modulation." The time domain PSS signal may be obtained by performing Inverse Discrete Fourier Transform (IDFT) of the frequency domain PSS signal.

The SSS sequences in frequency domain are generated by frequency interlacing of two length-31 M-sequences X and Y, each of which may take 31 different M-values. The SSS is extended with five zeros on each side and mapped to central 72 subcarriers as shown in FIG. 9. The DC subcarrier is not used. In 3GPP LTE wireless communication system, 168 valid combinations of X and Y are defined corresponding to 168 different PCI groups. The indices of particular values of X and Y are referred herein with $m_0$ and $m_1$. There are total of 31 different values possible for each of the indices $m_0$ and $m_1$. Therefore, the 168 valid PCI groups include $m_0$ and $m_1$ combinations that may have one of the two sequences common with other PCI groups. The time domain SSS signal may be obtained by performing IDFT of the frequency domain SSS signal.

In any wireless communication system, the signal transmitted by a cell may come across different propagation channel impairments before being received by a client terminal. The different propagation channel impairments include multipath propagation, scattering, shadowing, etc.

The multipath propagation refers to the reception of multiple delayed versions of the signal transmitted by a cell to a client terminal. The multipath propagation may result in inter-symbol interference in the time domain received signal which affects the orthogonality of the subcarriers and may cause the propagation channel to be a frequency selective channel. A multipath propagation channel model also referred to as power-delay profile is characterized by the power and delay of each path relative to the direct path.

Delay spread is the measure of the degree of multipath propagation in a wireless communication channel. It may be interpreted as a function of the difference between the time of arrival of the earliest significant multipath component and the time of arrival of the last multipath component. The Root Mean Square (RMS) delay spread is a metric to characterize the delay spread profile.

A discrete multipath time domain channel impulse response (CIR) is defined as follows:

$$h(n) = \sum_{i=0}^{l} \alpha_i \delta(n - \tau_i) \quad (1)$$

where,
  h(n) is the time domain CIR
  $a_i$ is the complex amplitude of $i^{th}$ path
  $\tau_i$ is the delay of $i^{th}$ path in number of samples
  (l+1) is total number of taps in the power-delay profile
  δ is the unit impulse response The RMS delay spread ($\tau_{rms}$) of a multipath profile is defined as follows:

$$\tau_{rms} = \sqrt{\frac{\sum_{i=0}^{l}(\tau_i - \bar{\tau})^2 |a_i|^2}{\sum_{i=0}^{l}|a_i|^2}} \quad (2)$$

where,
  $\bar{\tau}$ is the mean excess delay and defined as $$\bar{\tau} = \frac{\sum_{i=0}^{l} \tau_i |a_i|^2}{\sum_{i=0}^{l}|a_i|^2} \quad (3)$$

The 3GPP LTE wireless communication system uses the Cell specific Reference Signal (CRS) to assist the client terminals in estimating the channel and performing channel equalization i.e., to equalize the amplitude and phase distortions introduced by the frequency selective fading channel. The time domain positions of CRS within a subframe for normal CP and extended CP is illustrated in FIG. 10. The positions of the CRS in the time frequency grid of an OFDM symbol for normal CP and extended CP considering two transmit antenna ports are illustrated in FIG. 11.

In conventional methods, the channel estimation of non-CRS REs may be done using interpolation or filtering of CRS REs. The exact nature of interpolation or filtering may be a function of coherence bandwidth of the multipath power-delay profile. The coherence bandwidth of a channel, i.e., the frequency region over which a channel may be flat, is a function of the multipath power-delay profile. Thus the estimation of delay spread profile plays a crucial role in channel estimation and hence it may be useful to accurately identify the power-delay profile.

Conventional methods for delay spread profile estimation may use CRS in case of a 3GPP LTE wireless communication system. The high level block diagram for RMS delay spread estimation is illustrated in FIG. 12 and it involves the following three processes:
  CIR generation (processing block 1202)
  Number of valid path selection and computation of power of each path (processing block 1204)
  RMS delay spread metric computation (processing block 1206)

The CIR generation portion of delay spread estimation is illustrated in the block diagram 1300 contained in FIG. 13. At processing block 1302, the received time domain signal that includes CRS may be obtained after removing cyclic prefix based on the known OFDM symbol boundary. At processing block 1304, the frequency domain signal for a CRS OFDM symbol is obtained by performing Fast Fourier Transform (FFT) of the received time domain signal of that particular OFDM symbol. Then, at processing block 1306, the CRS RE's may be extracted from the received frequency domain signal of the CRS OFDM symbol based on the PCI input which may be obtained from cell search. At processing block 1308, the local replica of the CRS may be generated based on the a priori information about the modulating bits for CRS. The conjugate of the local replica may be multiplied with the extracted CRS to obtain the channel estimates of the CRS RE's in the processing block 1310. At processing block 1312, the demodulated CRSs of a particular CRS OFDM symbol are mapped to the corresponding frequency domain position thus constructing the channel frequency response (CFR) of a particular CRS OFDM symbol with accounting for the DC frequency subcarrier. The DC frequency subcarrier refers to the subcarrier at the zero frequency position. Transmission in DC or zero frequency may introduce distortion in the frequency spectrum due to local oscillator leakage. To avoid this impact, in 3GPP LTE wireless communication system DL DC subcarrier is unused. While generating the CFR of the CRS OFDM symbol, this needs to be accounted for, i.e., in the subcarrier corresponding to zero frequency, the value of zero needs to be inserted. The CIR may be generated by taking an Inverse FFT (IFFT) of the CFR in the processing block 1314. From the CIR, the valid path and corresponding power may be estimated, and from the estimated valid path, the RMS delay spread value may be computed.

The steps involved in valid path selection are illustrated in block diagram 1400 contained in FIG. 14. The output of the valid path selection is the power-delay profile. The steps involved in the RMS delay spread computation using the power-delay profile are illustrated in FIG. 15.

The use of CRS may be suitable for delay spread profile estimation for some scenarios such as deployment of higher channel bandwidths. In case of lower channel bandwidth deployments, the number of available CRS in one OFDM symbol may not be adequate for accurate delay spread estimation. A method and apparatus are disclosed that improve the delay spread estimation using other synchronization signals for lower channel bandwidth deployment scenarios.

SUMMARY

In accordance with an aspect of the present disclosure, a method may be for estimating delay spread in a wireless communication system for communication having less than or equal to a maximum channel bandwidth. The method may include controlling, by a processing device, determining a discrete multipath time domain channel impulse response (CIR) based on at least one of a Secondary Synchronization Signal (SSS) or a Primary Synchronization Signal (PSS) of a received signal; and determining, based on the CIR, a Root Mean Square (RMS) delay spread.

In one alternative, the CIR may be determined by: determining, from the received signal, time domain samples corresponding to the SSS for a PSS offset and from which a cyclic prefix is removed, performing a Fast Fourier Transform (FFT) on the time domain samples to obtain a frequency domain signal of each Orthogonal Frequency Division Multiplexing (OFDM) symbol having the SSS, determining, from other than a DC subcarrier and each null subscarrier of the frequency domain signal of each OFDM symbol having the SSS, SSS resource elements (REs), $SSS_{in}$, generating a local replica of the SSS, $d(n)$, wherein n is a number of subcarriers, demodulating the $SSS_{in}$ with the local replica $d(n)$ to obtain a channel estimate H for the SSS, $H(n)$, wherein $H(n)=SSS_{in}(n)\times d(n)$ for $n=1$ to 62, in which a channel frequency response (CFR) is obtained from the channel estimate $H(n)$ by inserting a zero at the DC subcarrier and a zero at an end subcarrier, such that the CFR has a length of 64 subcarriers; and performing an Inverse FFT (IFFT) on the CFR to obtain the CIR.

In one alternative, the local replica $d(n)$ may be generated based on an M-sequence generation process.

In one alternative, $d(n)$ may be interlaced $m_0$ and $m_1$ sequences having values of positive or negative 1.

In one alternative, when a signal to noise ratio (SNR) is in a range of below a determined SNR range, the CIR may be determined over an averaging window.

In one alternative, the method may include controlling, by the processing device, determining whether each path of the CIR is a valid path based on a power corresponding to each path of the CIR, to obtain a power-delay profile.

In one alternative, the method may include controlling, by the processing device, determining, from the power-delay profile, the RMS delay spread.

In one alternative, the RMS delay spread may be determined based on Auto Regressive (AR) weighted averaging.

In one alternative, the demodulating of the $SSS_{in}$ may be performed using differential correlation.

In one alternative, the CIR may be determined by: determining, from the received signal, time domain samples corresponding to the PSS from which a cyclic prefix is removed, performing a Fast Fourier Transform (FFT) on the time domain samples to obtain a frequency domain signal of each Orthogonal Frequency Division Multiplexing (OFDM) symbol having the PSS, determining, from other than a DC subcarrier and each null subscarrier of the frequency domain signal of each OFDM symbol with the PSS, PSS resource elements (REs), $PSS_{in}$, generating a local replica of the PSS, (n), wherein n is a number of subcarriers, demodulating the $PSS_{in}$ with the local replica $d(n)$ to obtain a channel estimate H for the PSS, $H(n)$, wherein $H(n)=PSS_{in}(n)\times d(n)$ for $n=1$ to 62, in which a channel frequency response (CFR) is obtained from the channel estimate $H(n)$ by inserting a zero at the DC subcarrier and a zero at an end subcarrier, such that the CFR has a length of 64 subcarriers; and performing an IFFT on the CFR to obtain the CIR.

In one alternative, the demodulating of the $PSS_{in}$ may be performed using differential correlation.

In one alternative, the CIR may be determined by the processing device: determining, from the received signal, time domain samples corresponding to the PSS from which a cyclic prefix is removed, performing FFT on the time domain samples to obtain a frequency domain signal of each Orthogonal Frequency Division Multiplexing (OFDM) symbol having the PSS, determining, from other than a DC subcarrier and each null subscarrier of the frequency domain signal of each OFDM symbol having the PSS, PSS resource elements (REs), $PSS_{in}$, generating a local replica of the PSS, $d2(n)$, demodulating the $PSS_{in}$ with the local replica $d2(n)$ to obtain a channel estimate H2 for the PSS, $H2(n)$, wherein $H2(n)=PSS_{in}(n)\times d(n)$ for $n=1$ to 62, in which the CFR is obtained from the channel estimate $H2(n)$ by inserting a zero is inserted at the DC subcarrier and a zero is at an end subcarrier; and performing an IFFT on the CFR to obtain the CIR.

In one alternative, the demodulating of each of the $PSS_{in}$ and the $SSS_{in}$ may be performed using differential correlation.

In one alternative, the CIR may be determined based on the SSS and the PSS, and the method may further include controlling, by the processing device, determining whether each path of the CIR is a valid path based on a power corresponding to each path of the CIR, to obtain a power-delay profile.

In one alternative, the method may include controlling, by the processing device, determining, from the power-delay profile, the RMS delay spread.

In accordance with an aspect of the present disclosure, an apparatus for estimating delay spread in a wireless communication system for communication having less than or equal to a maximum channel bandwidth. The apparatus may include circuitry configured to control: determining a discrete multipath time domain channel impulse response (CIR) based on at least one of a Secondary Synchronization Signal (SSS) or a Primary Synchronization Signal (PSS) of a received signal; and determining, based on the CIR, a Root Mean Square (RMS) delay spread.

In one alternative of the apparatus, the CIR may be determined by: determining, from the received signal, time domain samples corresponding to the SSS for a PSS offset and from which a cyclic prefix is removed, performing a Fast Fourier Transform (FFT) on the time domain samples to obtain a frequency domain signal of each Orthogonal Frequency Division Multiplexing (OFDM) symbol having the SSS, determining, from other than a DC subcarrier and each null subcarrier of the frequency domain signal of each OFDM symbol having the SSS, SSS resource elements (REs), $SSS_{in}$, generating a local replica of the SSS, d(n), wherein n is a number of subcarriers, demodulating the $SSS_{in}$ with the local replica d(n) to obtain a channel estimate H for the SSS, H(n), wherein H(n)=$SSS_{in}$(n)×d(n) for n=1 to 62, in which a channel frequency response (CFR) is obtained from the channel estimate H(n) by inserting a zero at the DC subcarrier and a zero at an end subcarrier, such that the CFR has a length of 64 subcarriers; and performing an Inverse FFT (IFFT) on the CFR to obtain the CIR.

In one alternative of the apparatus, the circuitry may be configured to control determining whether each path of the CIR is a valid path based on a power corresponding to each path of the CIR, to obtain a power-delay profile.

In one alternative of the apparatus, the CIR may be determined by: determining, from the received signal, time domain samples corresponding to the PSS from which a cyclic prefix is removed, performing a Fast Fourier Transform (FFT) on the time domain samples to obtain a frequency domain signal of each Orthogonal Frequency Division Multiplexing (OFDM) symbol having the PSS, determining, from other than a DC subcarrier and each null subcarrier of the frequency domain signal of each OFDM symbol with the PSS, PSS resource elements (REs), $PSS_{in}$, generating a local replica of the PSS, (n), wherein n is a number of subcarriers, demodulating the $PSS_{in}$ with the local replica d(n) to obtain a channel estimate H for the PSS, H(n), wherein H(n)=$PSS_{in}$(n)×d(n) for n=1 to 62, in which a channel frequency response (CFR) is obtained from the channel estimate H(n) by inserting a zero at the DC subcarrier and a zero at an end subcarrier, such that the CFR has a length of 64 subcarriers; and performing an IFFT on the CFR to obtain the CIR.

In accordance with an aspect of the present disclosure, a wireless communication device may include a receiver to receive a signal of a wireless communication system; and a processing device configured to control estimating delay spread for communication having less than or equal to a maximum channel bandwidth, wherein the processing device is configured to control: determining a discrete multipath time domain channel impulse response (CIR) based on at least one of a Secondary Synchronization Signal (SSS) or a Primary Synchronization Signal (PSS) of a received signal; and determining, based on the CIR, a Root Mean Square (RMS) delay spread.

BRIEF DESCRIPTION OF THE DRAWINGS

FIG. 2 illustrates FDD, TDD and H-FDD duplexing techniques.

DETAILED DESCRIPTION

Figure 1:
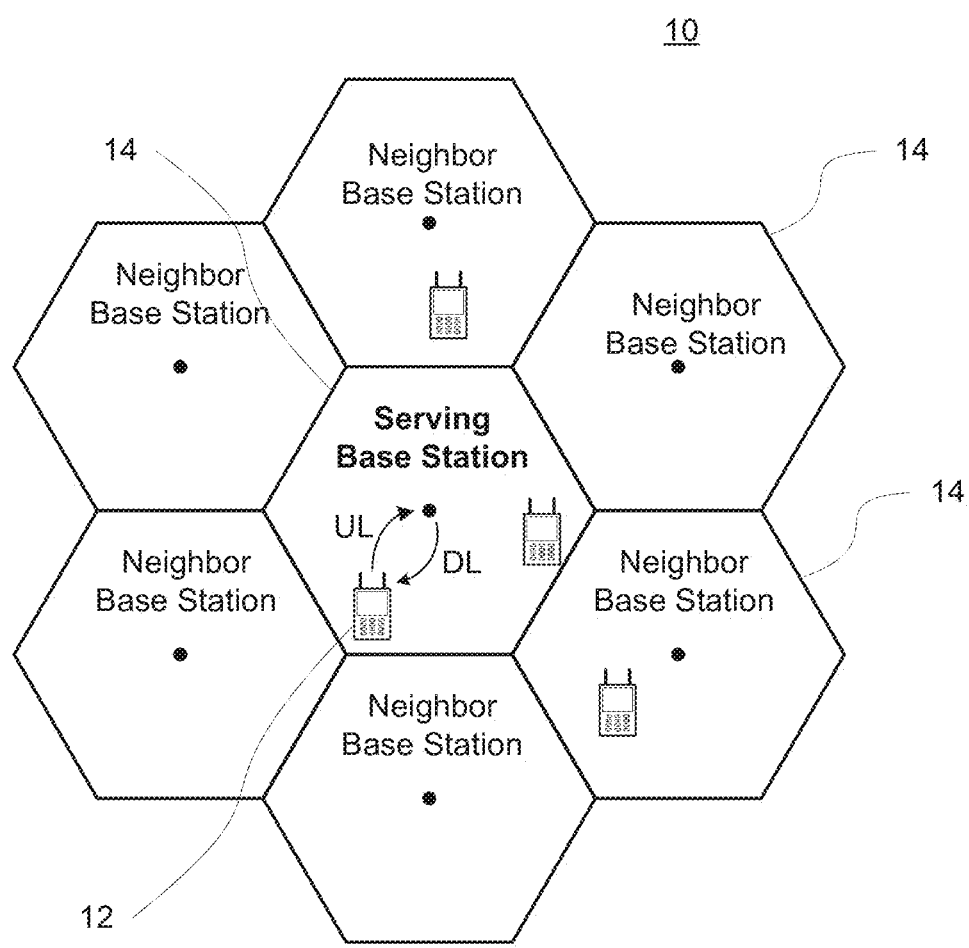
FIG. 1 illustrates a conventional wireless cellular communication system.
Figure 3:
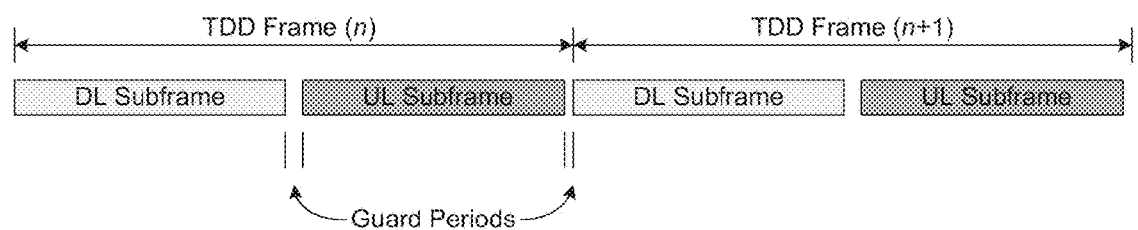
FIG. 3 illustrates a TDD frame consisting of DL portions and UL portions.
Figure 4:
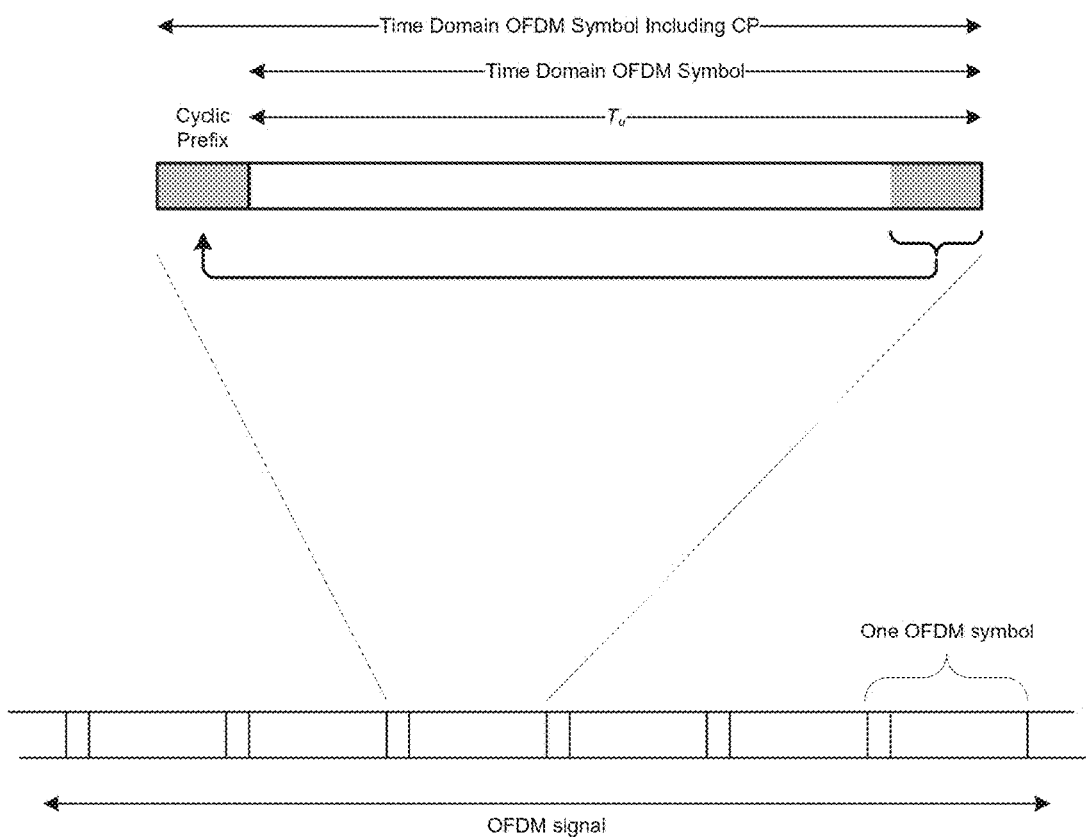
FIG. 4 illustrates an OFDM symbol with a Cyclic Prefix Insertion.
Figure 5:
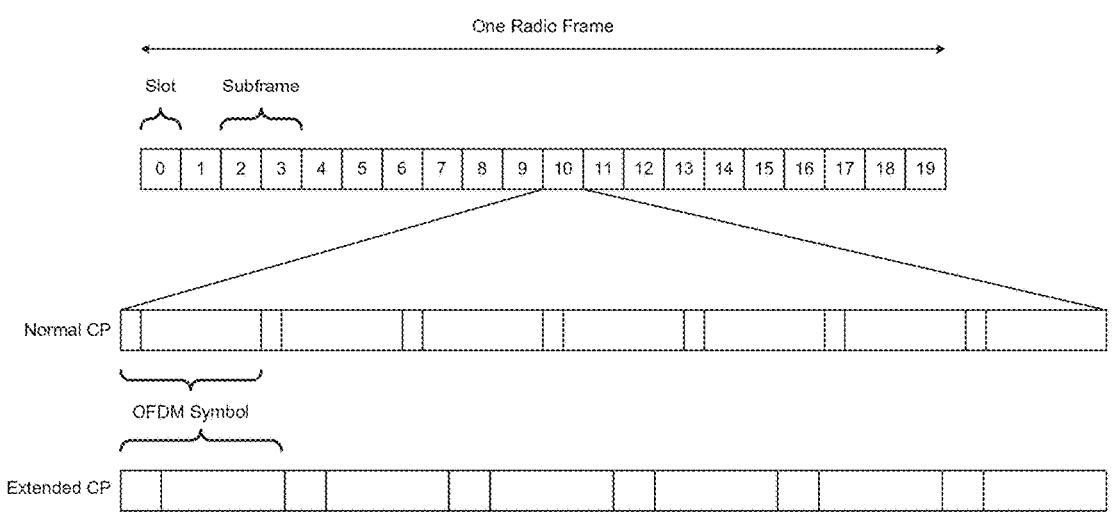
FIG. 5 illustrates the frame structure of the air interface of the 3GPP LTE wireless communication system.
Figure 6:
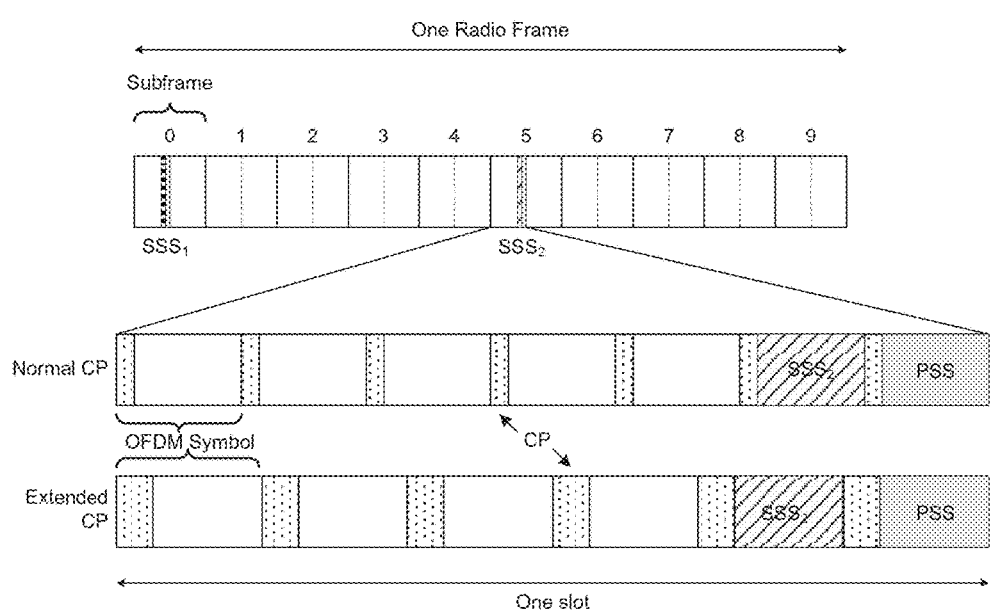
FIG. 6 illustrates the locations of PSS and SSS for Normal CP and Extended CP in case of a FDD 3GPP LTE wireless communication system.
Figure 7:
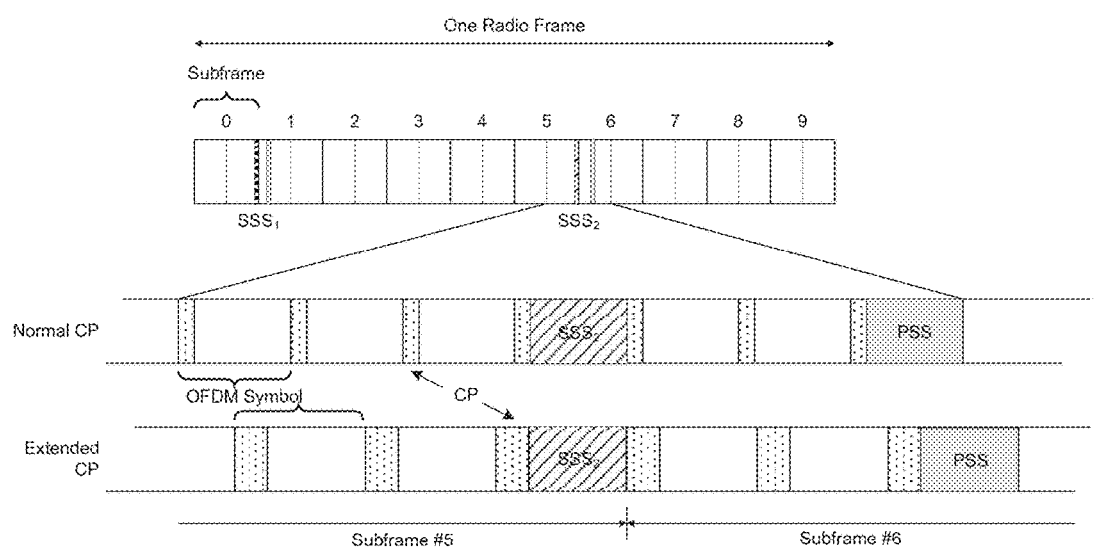
FIG. 7 illustrates the locations of PSS and SSS for Normal CP and Extended CP in case of a TDD 3GPP LTE wireless communication system.
Figure 8:
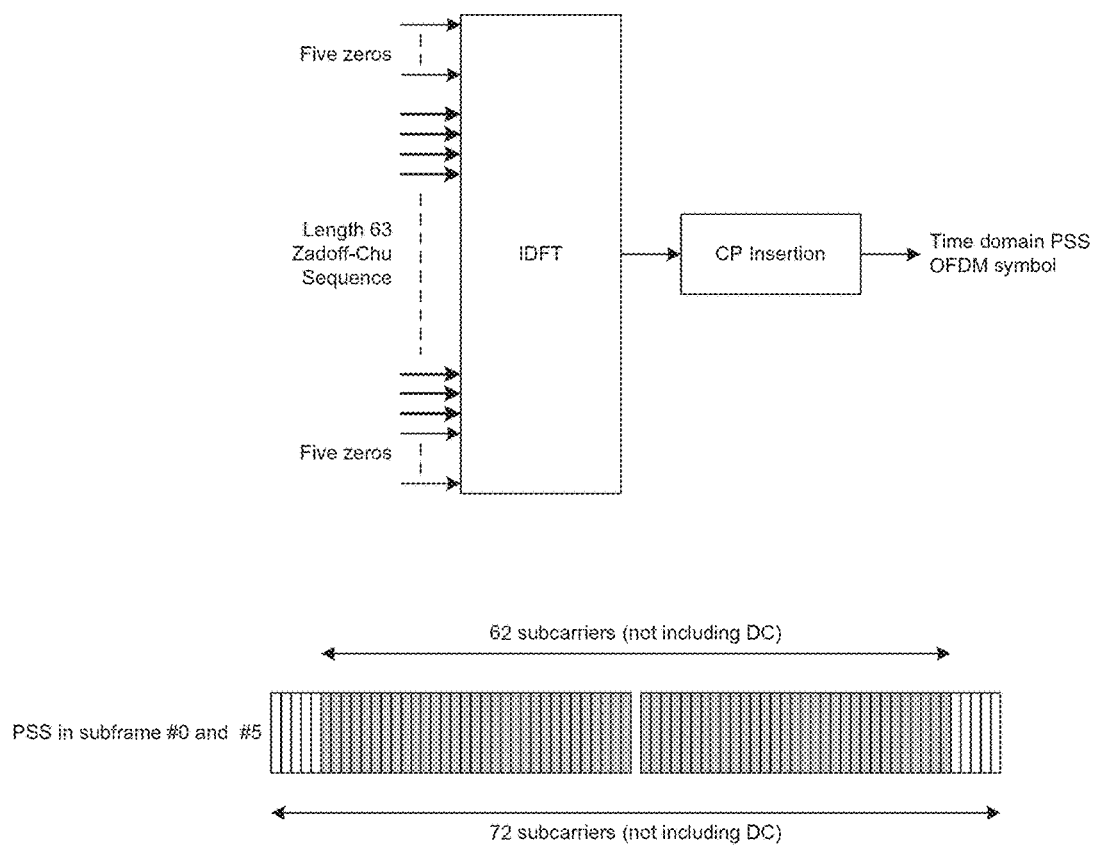
FIG. 8 illustrates PSS generation procedures for a 3GPP LTE wireless communication system.
Figure 9:
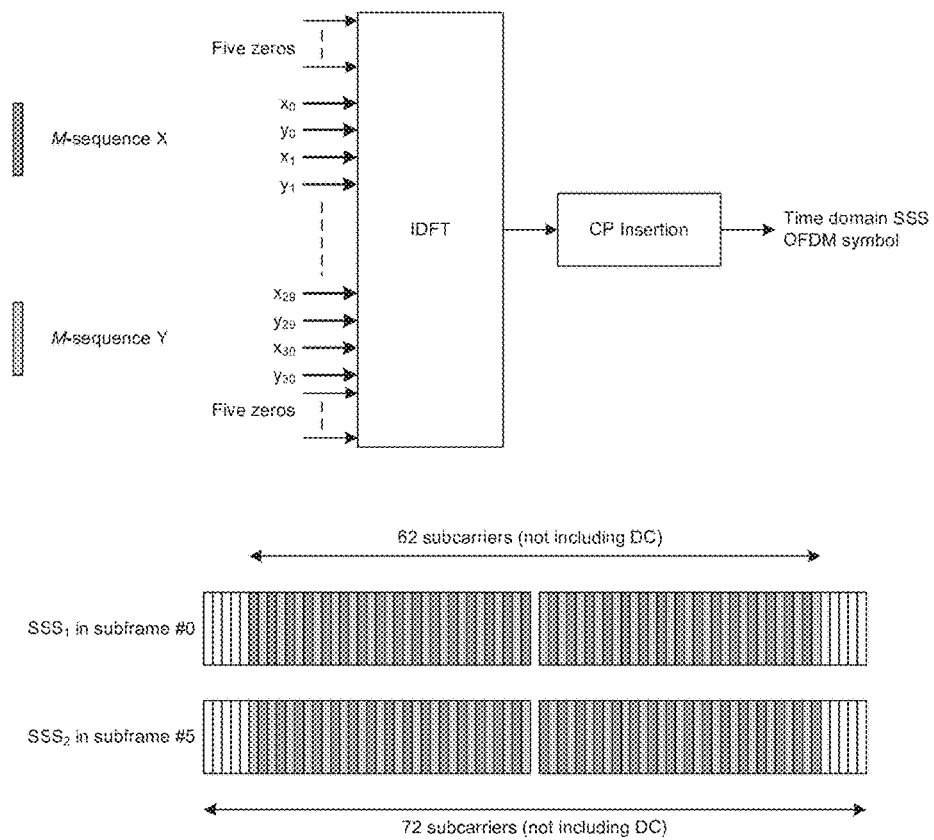
FIG. 9 illustrates SSS generation procedures for a 3GPP LTE wireless communication system.
Figure 10:
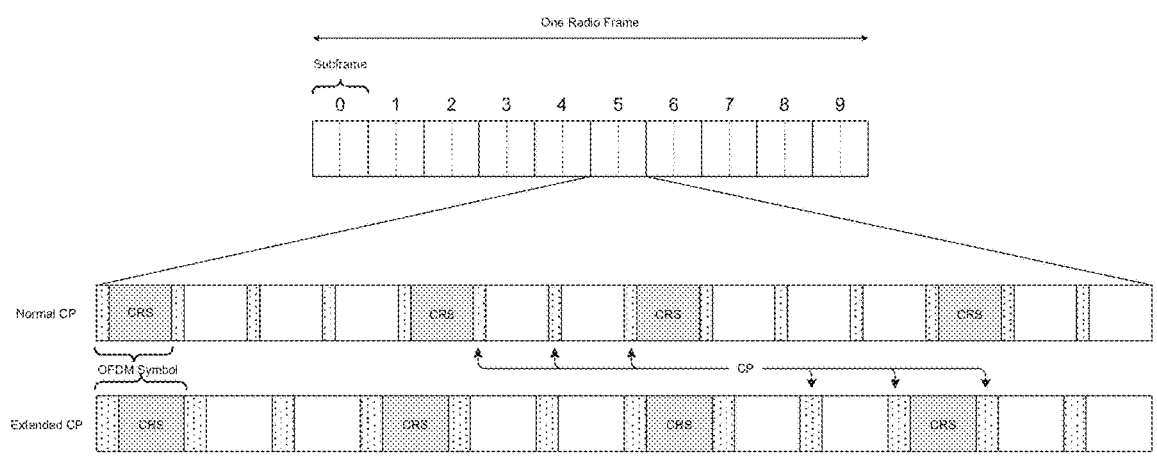
FIG. 10 illustrates the time domain location of CRS for Normal and Extended CP considering one or two transmit antenna ports in the case of a 3GPP LTE wireless communication system.
Figure 11:
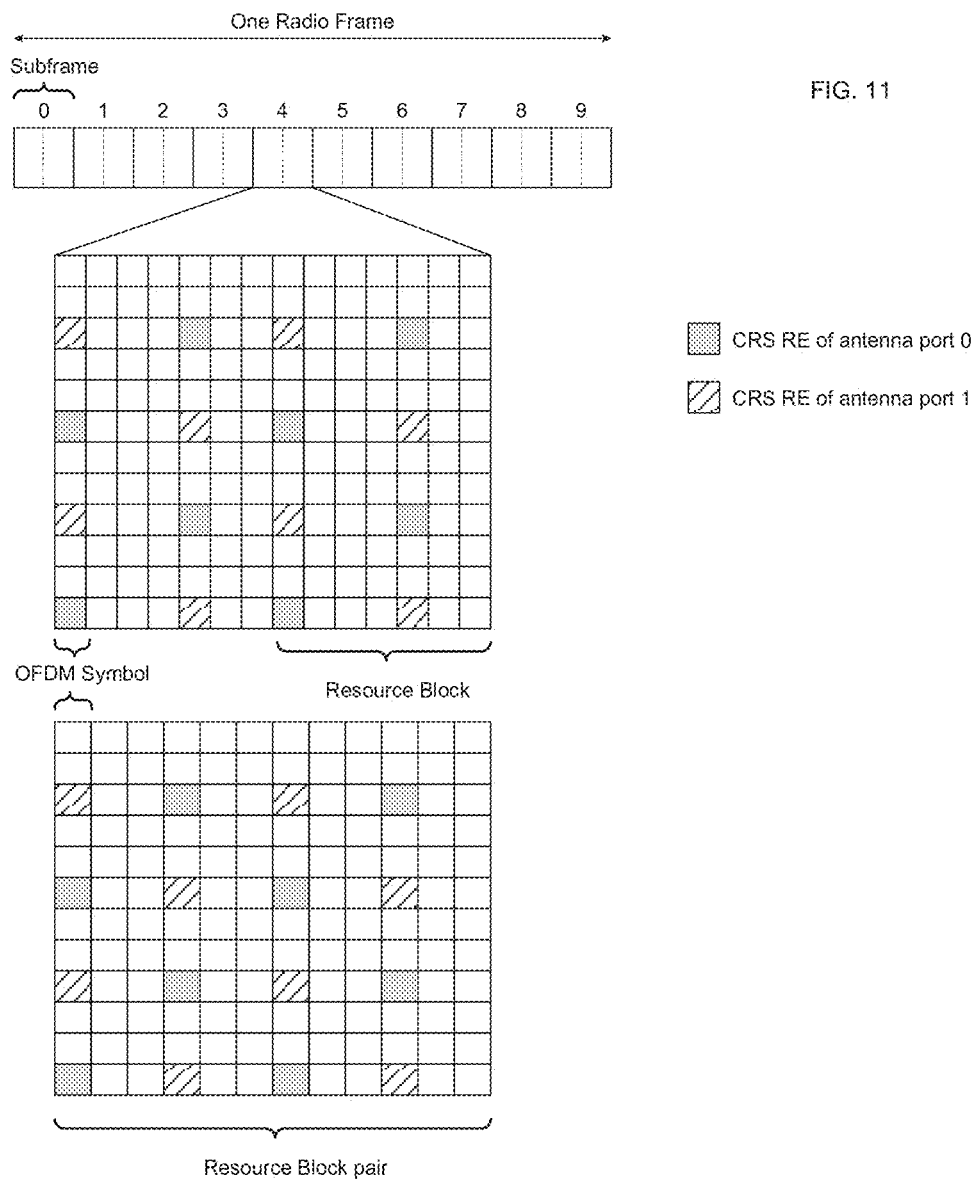
FIG. 11 illustrates the positions of CRS in the time-frequency grid for Normal CP and Extended CP for one Resource Block (RB) over one subframe considering two transmit antenna ports in the case of a 3GPP LTE wireless communication system.

The foregoing aspects, features and advantages of the present disclosure will be further appreciated when considered with reference to the following description of preferred embodiments and accompanying drawings, wherein like reference numerals represent like elements. In describing the preferred embodiments of the disclosure illustrated in the appended drawings, specific terminology will be used for the sake of clarity. However, the disclosure is not intended to be limited to the specific terms used.

Figure 16:
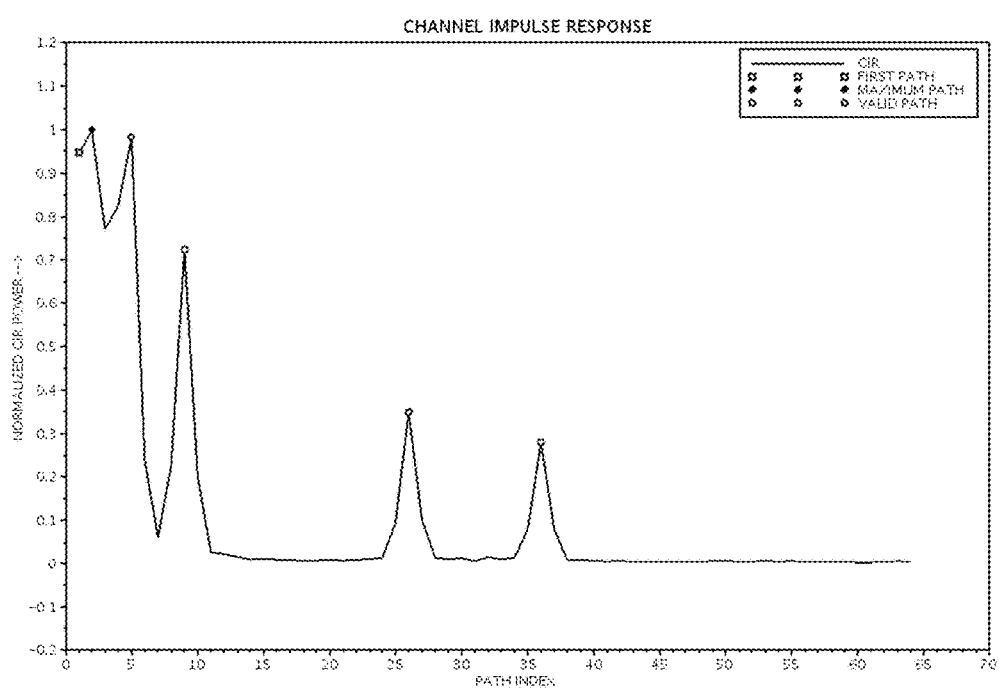
FIG. 16 illustrates an example Channel Impulse Response and the various terms used in the present disclosure.

The following terminology is used to describe various aspect of the present disclosure. An example power-delay profile is illustrated in FIG. 16. A first path in a power-delay profile is the first valid path with least delay relative to all the selected paths. The path index of the first path is referred to as the first path index. The threshold used to identify the valid first path is termed as the first path threshold. The maximum delay path is the path for which the power is maximum and corresponding path index and power is referred as maximum path index and the maximum power respectively. Valid path threshold is the threshold used to detect all the valid paths in CIR excluding the first path and the maximum path.

According to an aspect of the present disclosure, the SSS may be used for delay spread estimation in case of lower channel bandwidth. The main advantage of SSS is that the density of SSS, which is a priori known signal, is more than the density of CRS. The use of SSS may provide better estimate than the one estimated using CRS. Although the SSS occurs only once every 5 ms and the delay spread estimate may be available at a time granularity of 5 ms, the impact of reduced periodicity may be negligible because the delay spread profile and in particular the RMS delay spread may be unlikely to vary at a finer time granularity than 5 ms. According to an aspect of the present disclosure, the SSS may be used to estimate the delay spread by first constructing the time domain CIR followed by RMS computation.

Figure 12:
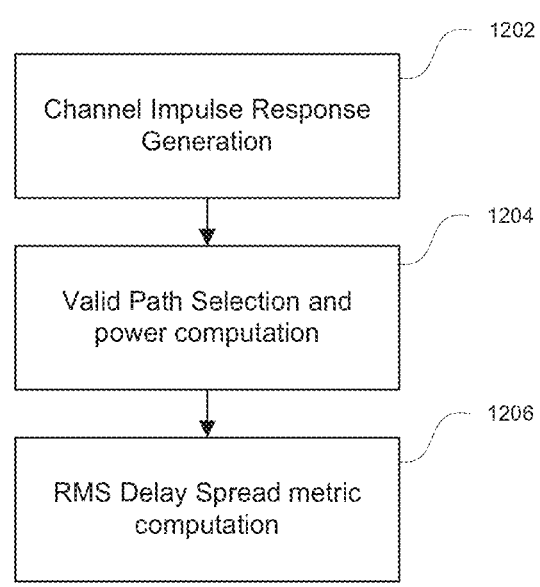
FIG. 12 illustrates a high level block diagram of the processing stages for delay spread estimation.
Figure 13:
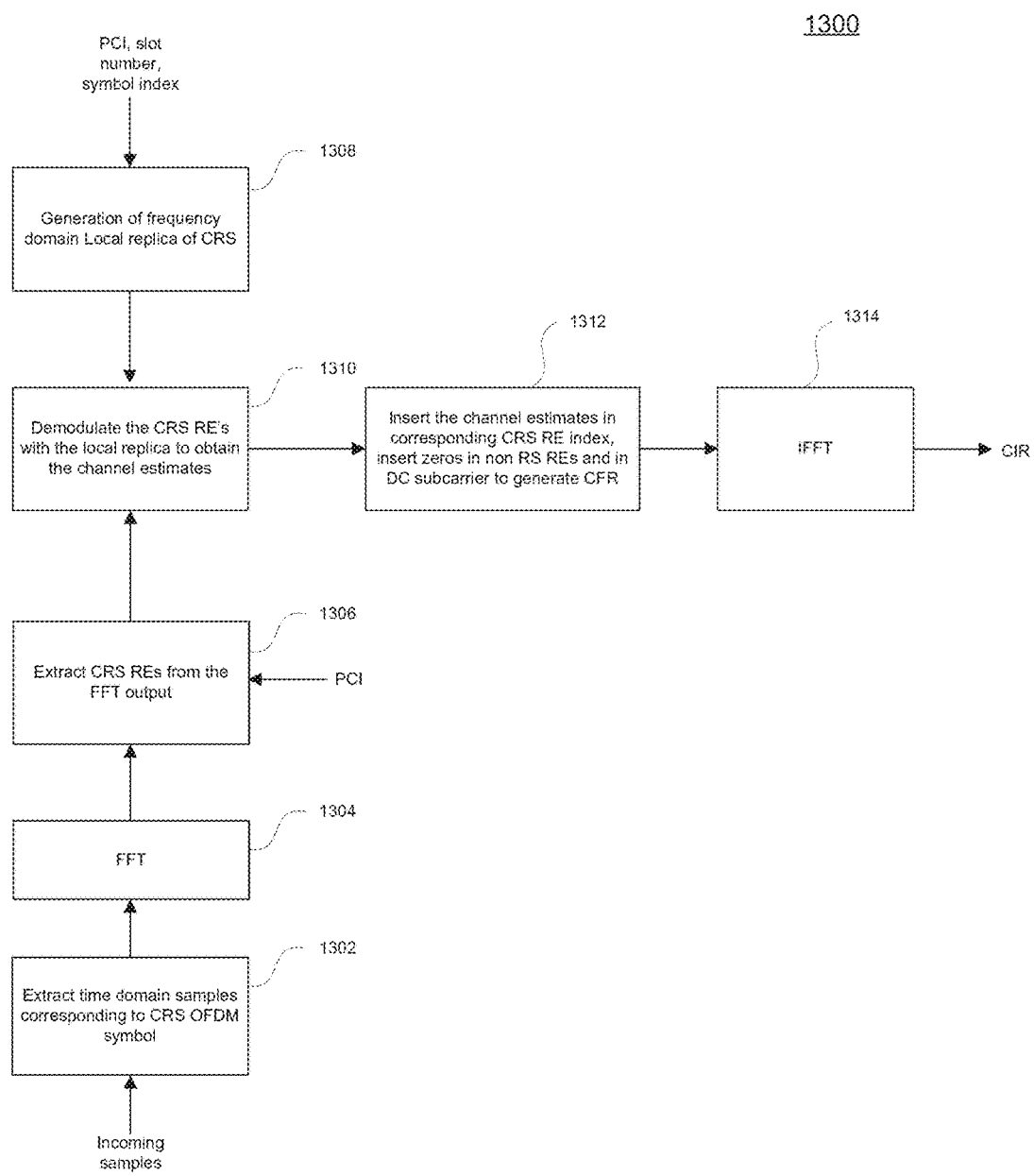
FIG. 13 illustrates the steps involved in the channel impulse response generation using CRS.
Figure 17:
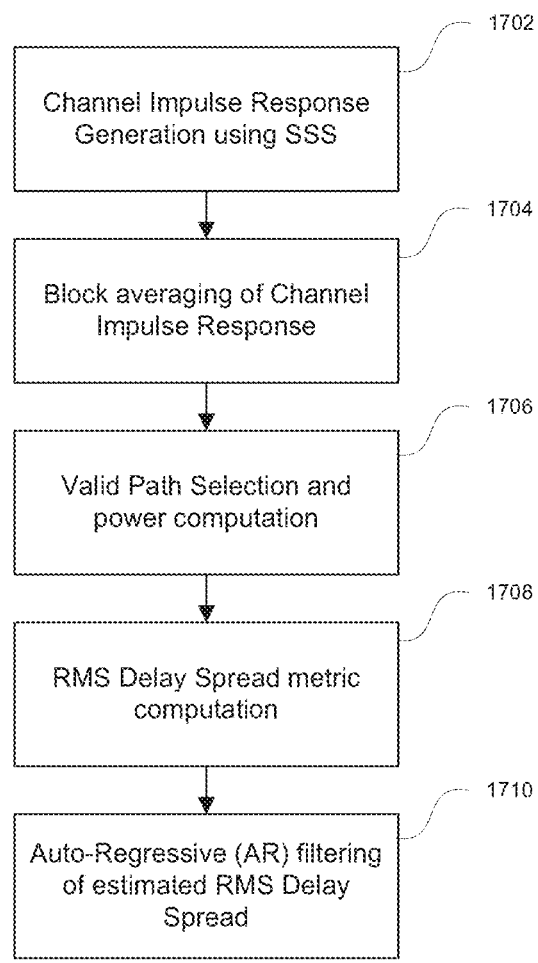
FIG. 17 illustrates a high level block diagram of the processing stages for delay spread estimation according to the aspects of the present disclosure.
Figure 18:
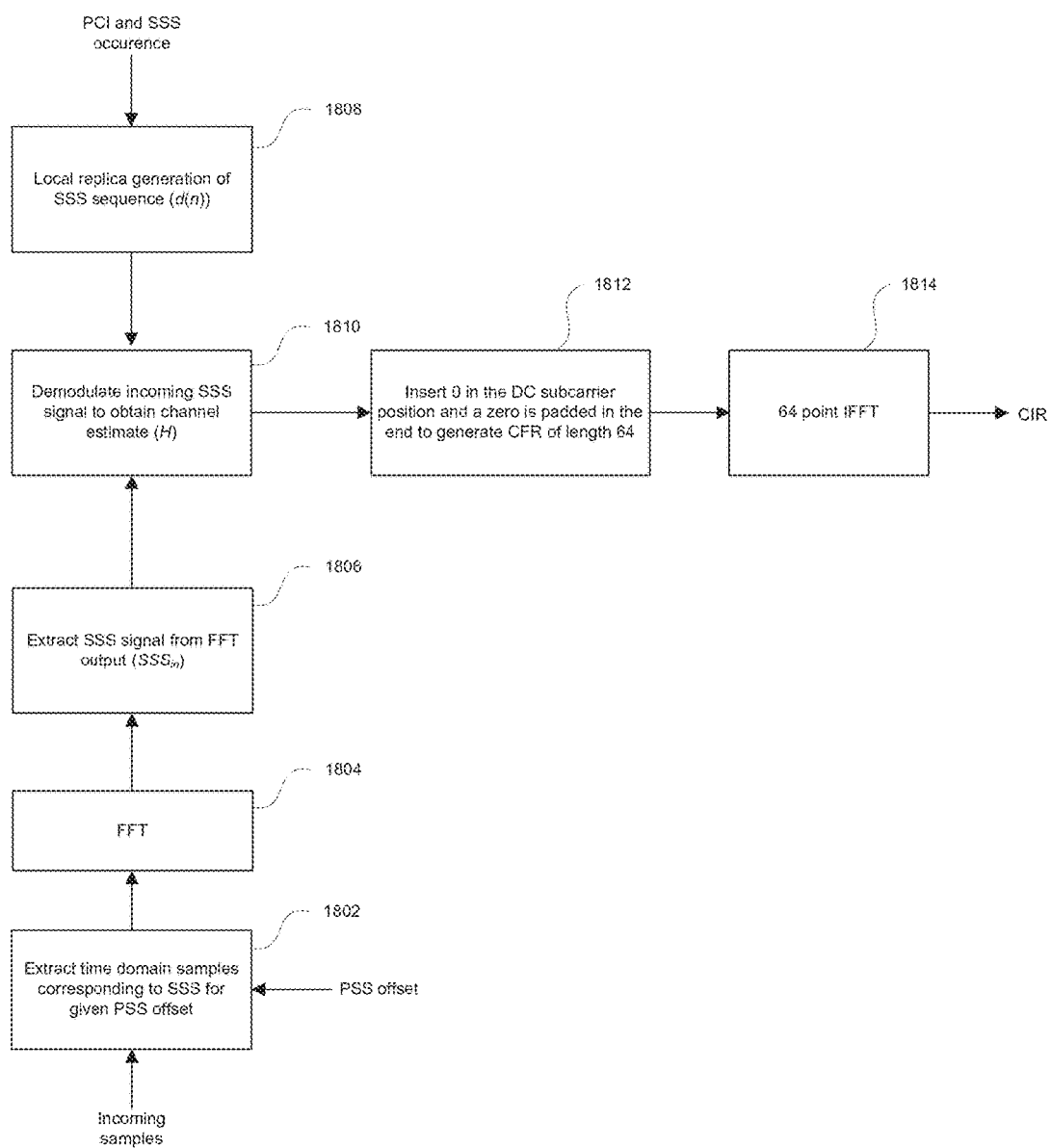
FIG. 18 illustrates the steps involved in the channel impulse response generation using SSS according to the aspects of the present disclosure.

The delay spread estimation using SSS by constructing the time domain CIR according to the aspects of the present disclosure may be performed in five different stages as illustrated in FIG. 17. Some of the stages of the method in the present disclosure use the processing steps from conventional methods. The first processing stage 1702, which generates the CIR using the SSS, is an innovative aspect of the method disclosed in the present disclosure. The processing stages 1706 and 1710 are similar to the processing stages 1204 and 1206 in FIG. 12 for a conventional method of delay spread estimation. The processing stages 1706 and 1710 are additional stages according to the aspects of the present disclosure. According to an aspect of the present disclosure, in the first stage, the CIR may be generated using SSS. This is illustrated in the block diagram 1800 contained in FIG. 18. At processing block 1802, the received time domain SSS signal after removing cyclic prefix may be obtained based on the PSS offset input which may provide the location on the detected PSS in the captured sample data. At processing stage 1804, the frequency domain signal of each OFDM symbol with SSS may be obtained by performing FFT. At processing block 1806, the received SSS REs, referred to as $SSS_{in}$, may be extracted from the frequency domain signal of the OFDM symbol containing SSS excluding the DC subcarrier and the null subcarriers. The demodulation of SSS is illustrated in the block diagram 1900 contained in FIG. 19. At processing block 1808 contained in FIG. 18, the local replica generation of SSS is performed to demodulate the received SSS and obtain the channel frequency response of the SSS subcarriers. The local replica d(n) may be generated using conventional M-sequence generation methods. At processing block 1810, the local replica signal d(n) is multiplied with the received SSS REs signal $SSS_{in}(n)$ to demodulate and obtain the channel estimate H for the SSS as follows:

$$H(n) = SSS_{in}(n) \times d(n) \text{ for } n=1 \text{ to } 62 \quad (4)$$

where d(n) in EQ. (4) is the interlaced $m_0$ and $m_1$ sequences which can take the values ±1. The $SSS_{in}$ is the received frequency domain SSS in which the DC component is removed. The demodulation of SSS provides the CFR. At processing block 1812, in the CFR, a zero is inserted in the DC subcarrier position and another zero is padded to the end to obtain the CFR of length 64. The time domain CIR is then obtained by taking 64 point IFFT of the CFR in the processing block 1814.

According to an aspect of the present disclosure, in the second stage of the delay spread estimation, in order to improve the reliability of peak selection for low SNR range, the power of the CIR of length 64 may be averaged over an averaging window. The power of CIR obtained at the end of the averaging duration may be used for valid path selection and RMS delay spread computation. The averaging window may, for example, cover a block of four consecutive SSS instances.

Figure 14:
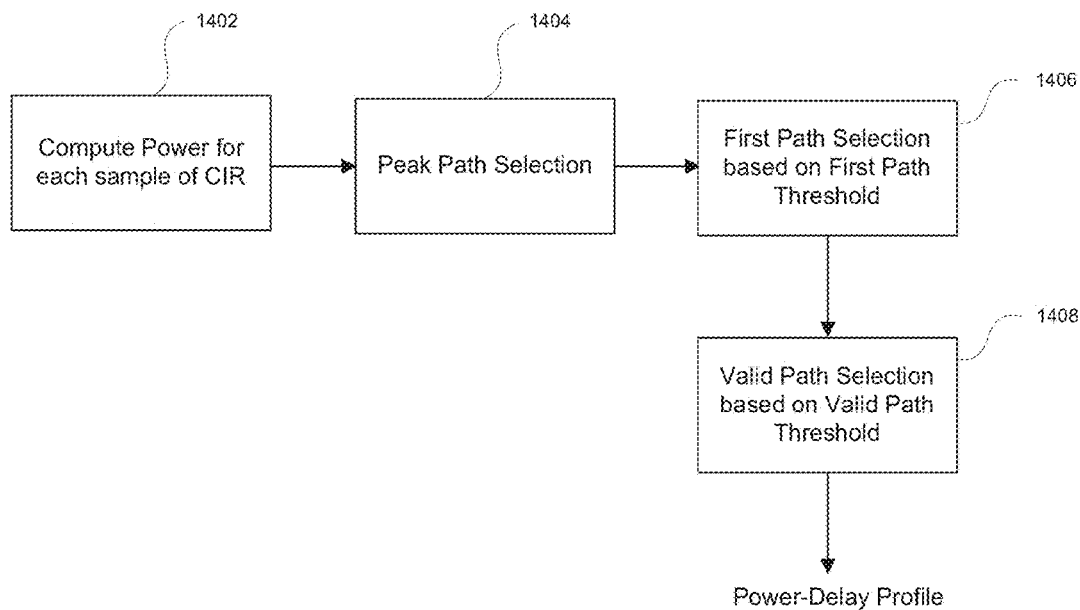
FIG. 14 illustrates the processing involved in the valid path selection and CIR power computation.

According to an aspect of the present disclosure, in the third stage of the delay spread estimation, the valid path selection and corresponding power computation may be performed as per conventional method illustrated in the block diagram 1400 contained in FIG. 14. At processing block 1402, the power of each path of CIR is computed as the product of the complex magnitude of the each path with its complex conjugate. At processing block 1404, the maximum power and the corresponding index, referred to as maximum path index, may be obtained by scanning the CIR over the entire length of 64 to detect the strongest path i.e., the path with maximum power. At processing block 1406, the CIR may be re-scanned from the beginning until a path is detected whose power may be greater than or equal to the value calculated by multiplying first path threshold with the maximum power. This path may be declared as the first path and the corresponding index as the first path index. At processing block 1408, the CIR is scanned from the maximum path index to the end i.e., till the $64^{th}$ sample to detect the valid paths by comparing the power of each path with the value calculated by multiplying valid path threshold with the maximum power. In such a way all the valid paths with their power and corresponding indices referred as valid path indices are obtained. The purpose of valid path threshold is to detect all the true paths above the noise level. As the valid path threshold is dependent on the noise level, different valid path threshold may be used for different range of signal to noise ratio (SNR).

Figure 15:
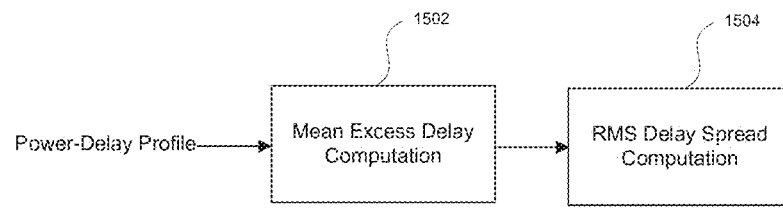
FIG. 15 illustrates the block diagram of RMS delay spread estimation.

According to an aspect of the present disclosure, in the fourth stage of the delay spread estimation, the RMS delay spread metric may be computed using the power-delay profile computed as per the conventional equations. This is illustrated in the block diagram 1500 contained in FIG. 15. At processing block 1502, the mean excess delay is computed using the power delay profile obtained as per the following equation:

$$\bar{\tau} = \frac{\sum_{i=0}^{I} \tau_i |a_i|^2}{\sum_{i=0}^{I} |a_i|^2} \quad (5)$$

At processing block 1504, the RMS delay spread metric may be computed using the mean excess delay from EQ. (5) and the power-delay profile obtained as per the following equation:

$$\tau_{rms} = \sqrt{\frac{\sum_{i=0}^{I} (\tau_i - \bar{\tau})^2 |a_i|^2}{\sum_{i=0}^{I} |a_i|^2}} \quad (6)$$

According to an aspect of the present disclosure, in the fifth stage of the delay spread estimation, the conventional Auto Regressive (AR) type of weighted averaging may be used to improve the reliability of the estimate. In AR method of averaging, high estimation errors in the instantaneous estimates are avoided by providing appropriate weight to both the current estimate and the previous AR filtered estimate which may improve the accuracy of the estimate.

According to another aspect of the present disclosure, PSS may also be used to estimate the power-delay profile using RMS computation by constructing the time domain CIR. Estimation using PSS differs from that of SSS only in the first stage i.e., CIR generation process while the subsequent stages are same as that for SSS. The frequency domain signal of the OFDM symbol with PSS is obtained by performing FFT of the time domain signal of that particular OFDM symbol after removing CP. The received PSS REs, referred as $PSS_{in}$, are extracted from the frequency domain signal of the OFDM symbol containing PSS excluding the DC subcarrier and null subcarriers. The local replica generation of PSS is performed to demodulate the received PSS and obtain the channel frequency response of the PSS subcarriers. The frequency domain local replica of the PSS sequence is generated using the Zadoff-Chu root indices 24, 29 and 34 corresponding to cell identity 0, 1 and 2 respectively within the PCI group. The local replica is multiplied with the $PSS_{in}$ to obtain the channel estimates corresponding to PSS subcarriers. The demodulation of PSS results in the CFR of the PSS subcarriers. In the CFR, a zero is inserted in the DC subcarrier and another zero is padded to the end to obtain the CFR of length 64. The time domain CIR is obtained by taking 64 point IFFT of the CFR. The subsequent stages of the estimation are same as that of the SSS. Considering the robustness of SSS to interference over PSS, SSS is used for illustration of the RMS delay spread estimation using aspects of the present disclosure. According to another aspect of the present disclosure, both PSS and SSS may be used to estimate the power-delay profile and the Delay Spread. With the use of both PSS and SSS, four measurements of the power-delay profile may be available in one radio frame of 10 ms duration.

Figure 19:
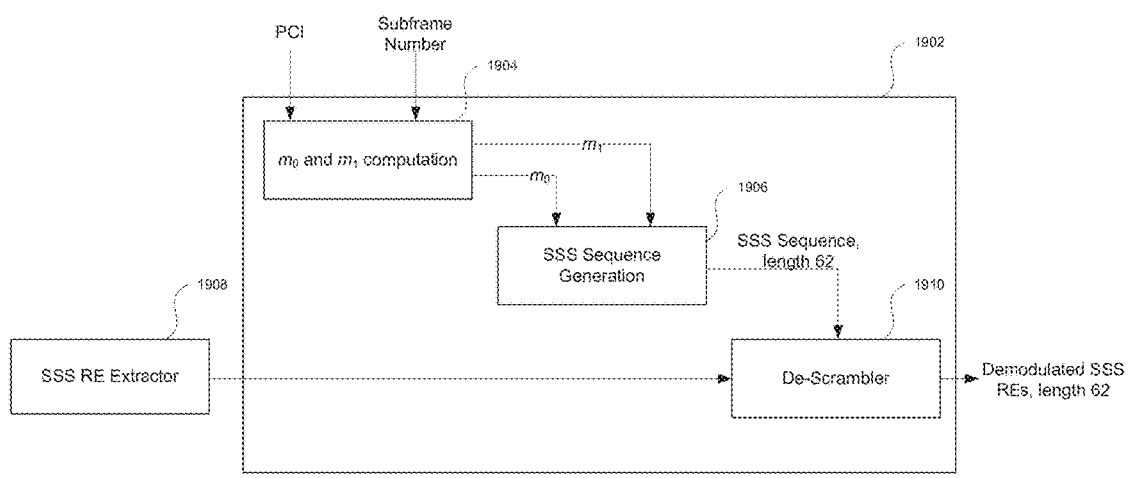
FIG. 19 illustrates a method for SSS demodulation, which may be employed with aspects of the disclosure described herein.

According to another aspect of the present disclosure, the SSS may be used to estimate the delay spread using differential correlation technique in frequency domain. Differential correlation may be obtained by first obtaining demodulated SSS Res as illustrated in FIG. 19. Next correlation may be performed between the demodulated adjacent SSS REs. Finally, the correlation of all the adjacent pairs of REs may be accumulated to obtain a single differential correlation value for the demodulated frequency domain SSS signal. The angle of the complex valued differential correlation may be used as an indicator of the prevailing Delay Spread. Other filtering techniques such as AR averaging may be used to obtain a more reliable Delay Spread estimate using differential correlation. According to another aspect of the present disclosure, the PSS may be used to estimate the delay spread using differential correlation technique in frequency domain. According to another aspect of the present disclosure, the differential correlation obtained using PSS and SSS may combined to obtain a more reliable estimate of the delay spread.

By way of example only, the above-described method may be implemented in a receiver, e.g., a user device such as a wireless mobile station (MS) 12 as shown in FIG. 1.

Figure 20:
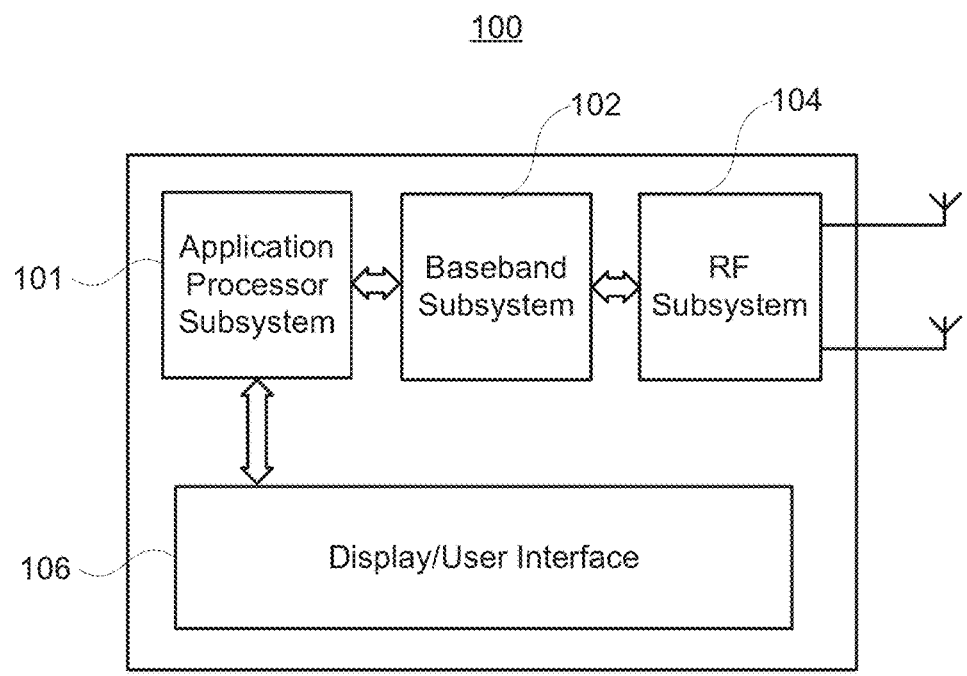
FIG. 20 illustrates a wireless mobile station diagram, which may be employed with aspects of the disclosure described herein.

As shown in FIG. 20, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 21:
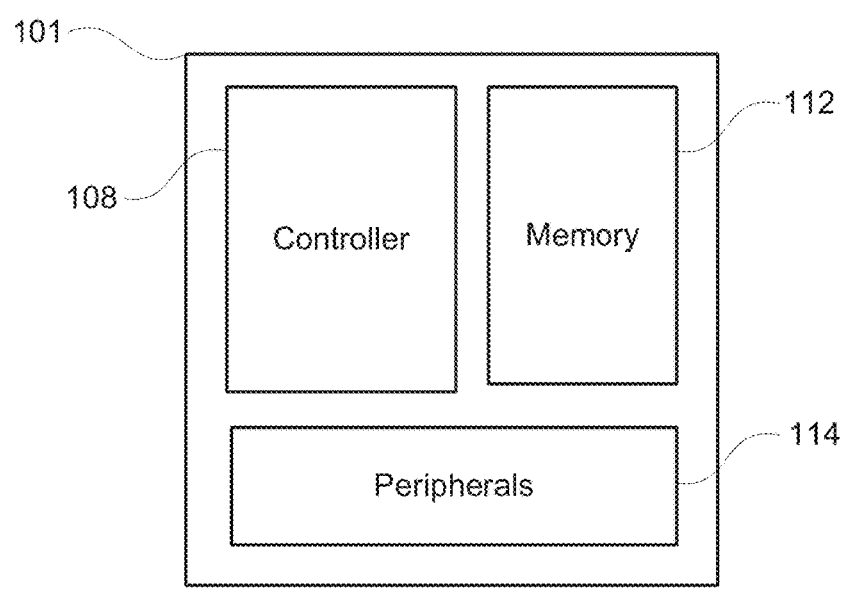
FIG. 21 illustrates an application processor subsystem for a wireless mobile station, which may be employed with aspects of the disclosure described herein.
Figure 22:
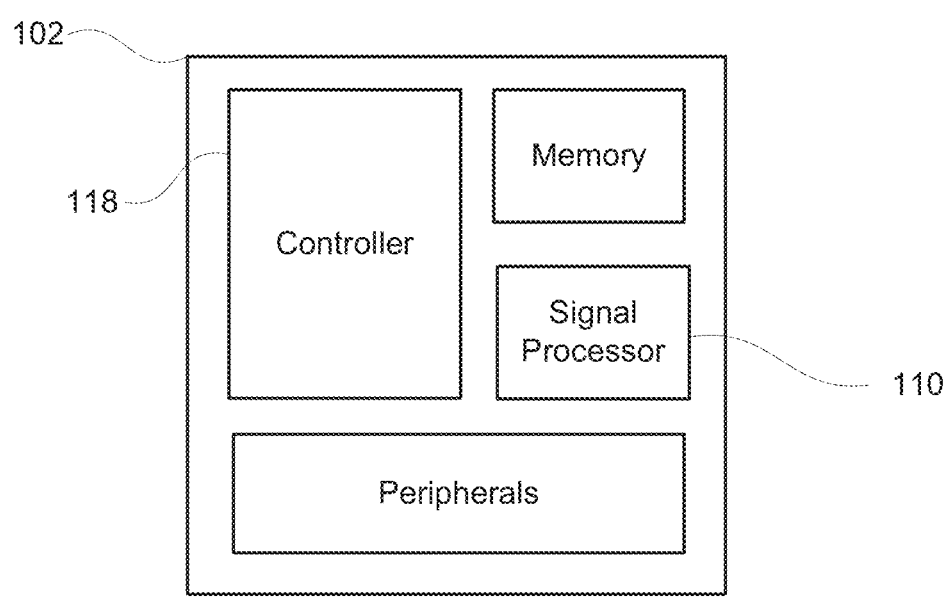
FIG. 22 illustrates a baseband subsystem for a wireless mobile station, which may be employed with aspects of the disclosure described herein.
Figure 23:
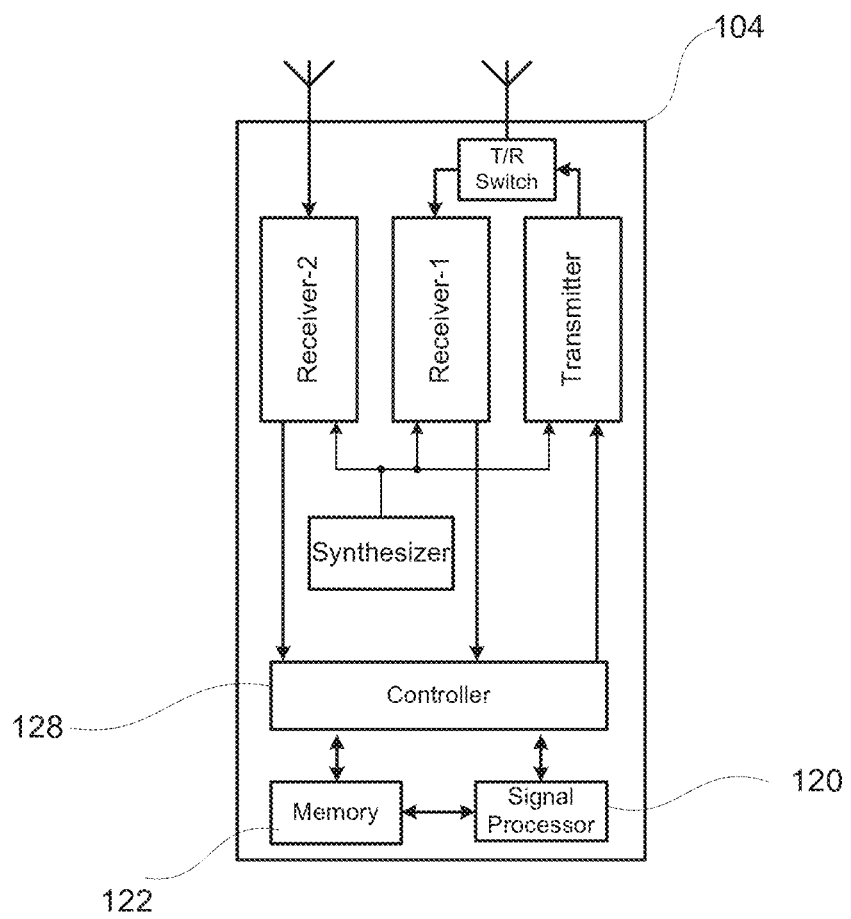
FIG. 23 illustrates an RF subsystem for a wireless mobile station, which may be employed with aspects of the disclosure described herein.

The application processor subsystem 101 as shown in FIG. 21 may include a controller 108 such as a microcontroller, another processor or other circuitry. The baseband subsystem 102 as shown in FIG. 22 may include a controller 118 such as a microcontroller or other processor. The RF subsystem 104 as shown in FIG. 23 may include a controller 128 such as a microcontroller, another processor or other circuitry. The controller 108 desirably handles overall operation of the MS 100. This may be done by any combination of hardware, software and firmware running on the controller 108. Such a combination of hardware, software and firmware may embody any methods in accordance with aspects of the present disclosure.

Peripherals 114 such as a full or partial keyboard, video or still image display, audio interface, etc may be employed and managed through the controller 108.

Aspects of the present disclosure may be implemented in firmware of the controller 108 of the application processor and/or the controller 118 of the baseband subsystem. In another alternative, aspects of the present disclosure may also be implemented as a combination of firmware and hardware of the application processor subsystem 101 and/or the baseband subsystem 102. For instance, a signal processing entity of any or all of the FIG. 22 may be implemented in firmware, hardware and/or software. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use the aspects of the disclosure may include smart phones, tablets, laptops, gaming consoles, cameras, video camcorders, TV, car entertainment systems, etc.

Although aspects of the disclosure herein have been described with reference to particular embodiments, it is to be understood that these embodiments are merely illustrative of the principles and applications of the aspects of the present disclosure. It is therefore to be understood that numerous modifications may be made to the illustrative embodiments and that other arrangements may be devised without departing from the spirit and scope of the aspects of the present disclosure as defined by the appended claims. Aspects of each embodiment may be employed in the other embodiments described herein.

The invention claimed is:

1. A method for estimating delay spread at a client terminal in a wireless communication system for communication from a base station of the wireless communication system having less than or equal to a maximum channel bandwidth, the method comprising:

controlling, by a processing device at the client terminal,
determining a discrete multipath time domain channel impulse response (CIR) based on at least one of a Secondary Synchronization Signal (SSS) or a Primary Synchronization Signal (PSS) of a received signal from the base station;

determining, based on the CIR, a Root Mean Square (RMS) delay spread; and at least one of (i) synchronizing the client terminal to the received signal or (ii) performing channel estimation on the received signal, using the RMS delay spread, wherein the CIR is determined by:

determining, from the received signal, time domain samples corresponding to the SSS for a PSS offset and from which a cyclic prefix is removed, performing a Fast Fourier Transform (FFT) on the time domain samples to obtain a frequency domain signal of each Orthogonal Frequency Division Multiplexing (OFDM) symbol having the SSS, determining SSS resource elements (REs) ($SSS_{in}$), from other than a DC subcarrier and each null subcarrier of the frequency domain signal of each OFDM symbol having the SSS, generating a local replica of the SSS, d(n), wherein n is a number of subcarriers, demodulating the $SSS_{in}$ with the local replica d(n) to obtain a channel estimate H for the SSS, H(n), wherein H(n)=$SSS_{in}$(n)×d(n), and performing an Inverse FFT (IFFT) on a channel frequency response (CFR) obtained from the channel estimate H(n), to obtain the CIR.

2. The method of claim 1, wherein H(n)=$SSS_{in}$(n)×d(n) for n=1 to 62, in which the CFR is obtained from the channel estimate H(n) by inserting a zero at the DC subcarrier and a zero at an end subcarrier, such that the CFR has a length of 64 subcarriers.

3. The method of claim 1, wherein the local replica d(n) is generated based on a sequence generation process.

4. The method of claim 1, wherein the local replica d(n) is generated by interlacing first and second and sequences having values of positive or negative 1.

5. The method of claim 1, wherein, when a signal to noise ratio (SNR) is in a range of below a determined SNR range, the CIR is determined over an averaging window.

6. The method of claim 1, further comprising:

controlling, by the processing device, a determination process that determines whether each path of the CIR is a valid path based on a power corresponding to each path of the CIR, to obtain a power-delay profile.

7. The method of claim 6, further comprising:

controlling, by the processing device, a determination process that determines, from the power-delay profile, the RMS delay spread.

8. The method of claim 7, wherein the RMS delay spread is determined based on Auto Regressive (AR) weighted averaging.

9. The method of claim 1, wherein the demodulating of the $SSS_{in}$ is performed using differential correlation.

10. A method for estimating delay spread at a client terminal in a wireless communication system for communication from a base station of the wireless communication system having less than or equal to a maximum channel bandwidth, the method comprising:

controlling, by a processing device at the client terminal, determining a discrete multipath time domain channel impulse response (CIR) based on at least one of a Secondary Synchronization Signal (SSS) or a Primary Synchronization Signal (PSS) of a received signal from the base station;

determining, based on the CIR, a Root Mean Square (RMS) delay spread; and at least one of (i) synchronizing the client terminal to the received signal or (ii) performing channel estimation on the received signal, using the RMS delay spread, wherein the CIR is determined by:

determining, from the received signal, time domain samples corresponding to the PSS from which a cyclic prefix is removed, performing a Fast Fourier Transform (FFT) on the time domain samples to obtain a frequency domain signal of each Orthogonal Frequency Division Multiplexing (OFDM) symbol having the PSS, determining PSS resource elements (REs) ($PSS_{in}$), from other than a DC subcarrier and each null subcarrier of the frequency domain signal of each OFDM symbol with the PSS, generating a local replica of the PSS, d(n), wherein n is a number of subcarriers, demodulating the $PSS_{in}$ with the local replica d(n) to obtain a channel estimate H for the PSS, H(n), wherein H(n)=$PSS_{in}$(n)×d(n), and performing an Inverse FFT (IFFT) on a channel frequency response (CFR) obtained from the channel estimate H(n), to obtain the CIR.

11. The method of claim 10, wherein the demodulating of the $PSS_{in}$ is performed using differential correlation.

12. The method of claim 1, wherein the CIR is determined by the processing device:

determining, from the received signal, time domain samples corresponding to the PSS from which a cyclic prefix is removed, performing FFT on the time domain samples to obtain a frequency domain signal of each Orthogonal Frequency Division Multiplexing (OFDM) symbol having the PSS, determining PSS resource elements (REs) ($PSS_{in}$), from other than a DC subcarrier and each null subcarrier of the frequency domain signal of each OFDM symbol having the PSS, generating a local replica of the PSS, d2(n), demodulating the $PSS_{in}$ with the local replica d2(n) to obtain a channel estimate H2 for the PSS, H2(n), wherein H2(n)=$PSS_{in}$(n)×d(n), and performing an IFFT on a second CFR obtained from the channel estimate H2(n), to obtain a second CIR, wherein the RMS delay spread is determined based on the CIR and the second CIR.

13. The method of claim 12, wherein the demodulating of each of the $PSS_{in}$ and the $SSS_{in}$ is performed using differential correlation.

14. The method of claim 1, wherein the CIR is determined based on the SSS and the PSS, and the method further comprising:

controlling, by the processing device, a determination process that determines whether each path of the CIR is a valid path based on a power corresponding to each path of the CIR, to obtain a power-delay profile.

15. The method of claim 14, further comprising:

controlling, by the processing device, a determination process that determines, from the power-delay profile, the RMS delay spread.

16. An apparatus for estimating delay spread at a client terminal in a wireless communication system for communication from a base station of the wireless communication system having less than or equal to a maximum channel bandwidth, the apparatus comprising:
  circuitry configured to control at the client terminal:
    determining a discrete multipath time domain channel impulse response (CIR) based on at least one of a Secondary Synchronization Signal (SSS) or a Primary Synchronization Signal (PSS) of a received signal from the base station;
    determining, based on the CIR, a Root Mean Square (RMS) delay spread; and
    at least one of (i) synchronizing the client terminal to the received signal or (ii) performing channel estimation on the received signal, using the RMS delay spread,
  wherein the CIR is determined by:
    determining, from the received signal, time domain samples corresponding to the SSS for a PSS offset and from which a cyclic prefix is removed,
    performing a Fast Fourier Transform (FFT) on the time domain samples to obtain a frequency domain signal of each Orthogonal Frequency Division Multiplexing (OFDM) symbol having the SSS,
    determining SSS resource elements (REs) ($SSS_{in}$), from other than a DC subcarrier and each null subcarrier of the frequency domain signal of each OFDM symbol having the SSS,
    generating a local replica of the SSS, d(n), wherein n is a number of subcarriers,
    demodulating the $SSS_{in}$ with the local replica d(n) to obtain a channel estimate H for the SSS, H(n), wherein H(n)=$SSS_{in}$(n)×d(n), and
    performing an Inverse FFT (IFFT) on a channel frequency response (CFR) obtained from the channel estimate H(n), to obtain the CIR.

17. The apparatus of claim 16,
  wherein H(n)=$SSS_{in}$(n)×d(n) for n=1 to 62,
  in which the CFR is obtained from the channel estimate H(n) by inserting a zero at the DC subcarrier and a zero at an end subcarrier, such that the CFR has a length of 64 subcarriers.

18. The apparatus of claim 16,
  wherein the circuitry is configured to control determining whether each path of the CIR is a valid path based on a power corresponding to each path of the CIR, to obtain a power-delay profile.

19. An apparatus for estimating delay spread at a client terminal in a wireless communication system for communication from a base station of the wireless communication system having less than or equal to a maximum channel bandwidth, the apparatus comprising:
  circuitry configured to control at the client terminal:
    determining a discrete multipath time domain channel impulse response (CIR) based on at least one of a Secondary Synchronization Signal (SSS) or a Primary Synchronization Signal (PSS) of a received signal from the base station;
    determining, based on the CIR, a Root Mean Square (RMS) delay spread; and
    at least one of (i) synchronizing the client terminal to the received signal or (ii) performing channel estimation on the received signal, using the RMS delay spread,
  wherein the CIR is determined by:
    determining, from the received signal, time domain samples corresponding to the PSS from which a cyclic prefix is removed,
    performing a Fast Fourier Transform (FFT) on the time domain samples to obtain a frequency domain signal of each Orthogonal Frequency Division Multiplexing (OFDM) symbol having the PSS,
    determining PSS resource elements (REs) ($PSS_{in}$), from other than a DC subcarrier and each null subcarrier of the frequency domain signal of each OFDM symbol with the PSS,
    generating a local replica of the PSS, d(n), wherein n is a number of subcarriers,
    demodulating the $PSS_{in}$ with the local replica d(n) to obtain a channel estimate H for the PSS, H(n), wherein H(n)=$PSS_{in}$(n)×d(n), and
    performing an Inverse FFT (IFFT) on a channel frequency response (CFR) obtained from the channel estimate H(n).

20. A wireless communication device comprising:
  a receiver to receive a signal of a wireless communication system; and
  a processor configured to control estimating delay spread at the wireless communication device as a client terminal in the wireless communication system for communication from a base station of the wireless communication system having less than or equal to a maximum channel bandwidth,
  wherein the processor is configured to control:
    determining a discrete multipath time domain channel impulse response (CIR) based on at least one of a Secondary Synchronization Signal (SSS) or a Primary Synchronization Signal (PSS) of a received signal from the base station;
    determining, based on the CIR, a Root Mean Square (RMS) delay spread; and
    at least one of (i) synchronizing the client terminal to the received signal or (ii) performing channel estimation on the received signal, using the RMS delay spread,
  wherein the CIR is determined by:
    determining, from the received signal, time domain samples corresponding to the SSS for a PSS offset and from which a cyclic prefix is removed,
    performing a Fast Fourier Transform (FFT) on the time domain samples to obtain a frequency domain signal of each Orthogonal Frequency Division Multiplexing (OFDM) symbol having the SSS,
    determining SSS resource elements (REs) ($SSS_{in}$), from other than a DC subcarrier and each null subcarrier of the frequency domain signal of each OFDM symbol having the SSS,
    generating a local replica of the SSS, d(n), wherein n is a number of subcarriers,
    demodulating the $SSS_{in}$ with the local replica d(n) to obtain a channel estimate H for the SSS, H(n), wherein H(n)=$SSS_{in}$(n)×d(n), and
    performing an Inverse FFT (IFFT) on a channel frequency response (CFR) obtained from the channel estimate H(n), to obtain the CIR.

21. A wireless communication device comprising:
  a receiver to receive a signal of a wireless communication system; and
  a processor configured to control estimating delay spread at the wireless communication device as a client terminal in the wireless communication system for communication from a base station of the wireless communication system having less than or equal to a maximum channel bandwidth,
  wherein the processor is configured to control:

determining a discrete multipath time domain channel impulse response (CIR) based on at least one of a Secondary Synchronization Signal (SSS) or a Primary Synchronization Signal (PSS) of a received signal from the base station;

determining, based on the CIR, a Root Mean Square (RMS) delay spread; and at least one of (i) synchronizing the client terminal to the received signal or (ii) performing channel estimation on the received signal, using the RMS delay spread, wherein the CIR is determined by:

determining, from the received signal, time domain samples corresponding to the PSS from which a cyclic prefix is removed, performing a Fast Fourier Transform (FFT) on the time domain samples to obtain a frequency domain signal of each Orthogonal Frequency Division Multiplexing (OFDM) symbol having the PSS, determining PSS resource elements (REs) ($PSS_{in}$), from other than a DC subcarrier and each null subcarrier of the frequency domain signal of each OFDM symbol with the PSS, generating a local replica of the PSS, d(n), wherein n is a number of subcarriers, demodulating the $PSS_{in}$ with the local replica d(n) to obtain a channel estimate H for the PSS, H(n), wherein $H(n)=PSS_{in}(n) \times d(n)$, and performing an Inverse FFT (IFFT) on a channel frequency response (CFR) obtained from the channel estimate H(n), to obtain the CIR.

22. The method of claim 10, wherein $H(n)=PSS_{in}(n) \times d(n)$ for n=1 to 62, in which the CFR is obtained from the channel estimate H(n) by inserting a zero at the DC subcarrier and a zero at an end subcarrier, such that the CFR has a length of 64 subcarriers.

* * * * *